UNITED STATES PATENT OFFICE.

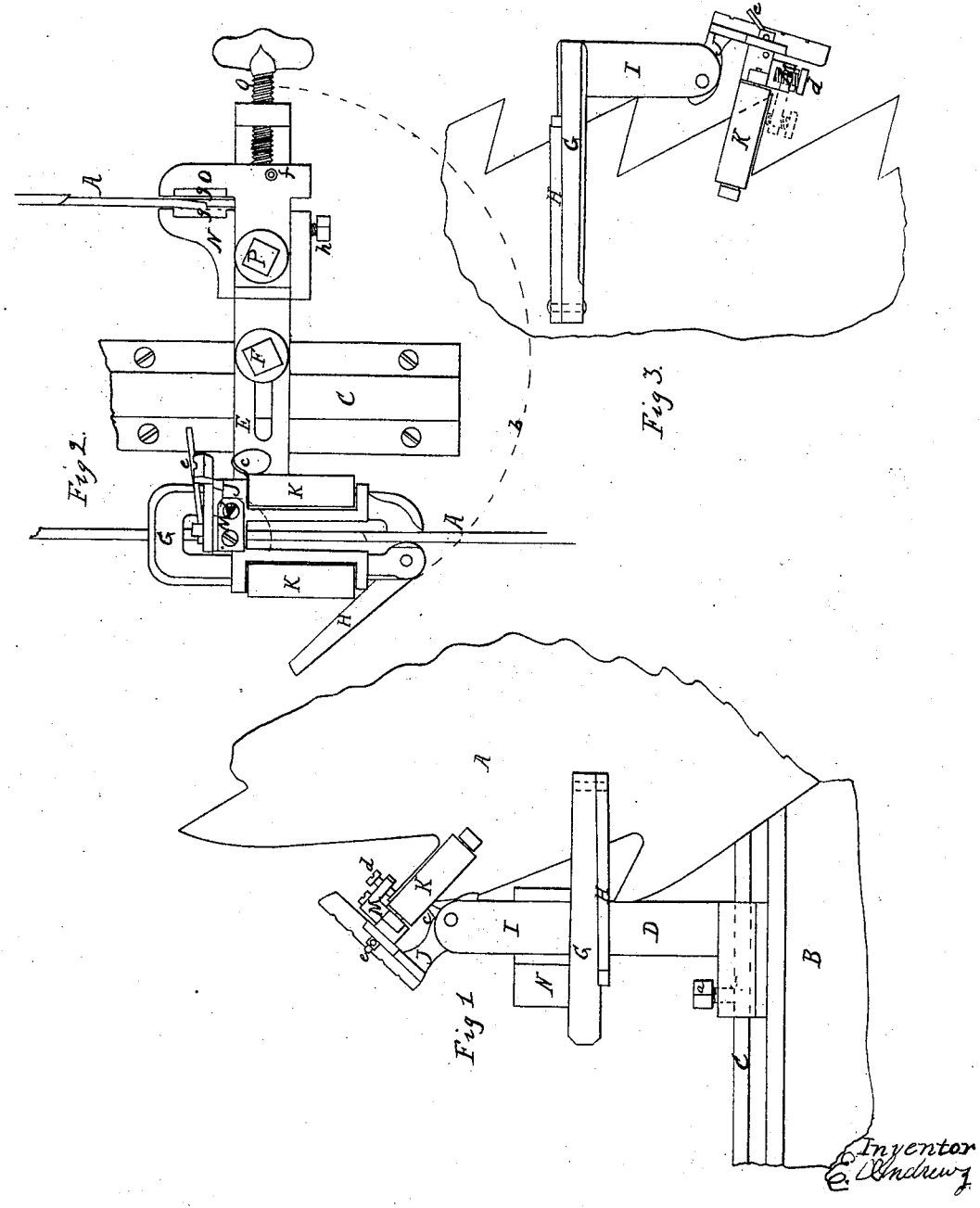

EMANUEL ANDREWS, OF ELMIRA, NEW YORK.

MACHINE FOR GAGING AND FILING SAWS.

Specification of Letters Patent No. 17,774, dated July 14, 1857.

*To all whom it may concern:*

Be it known that I, EMANUEL ANDREWS, of Elmira, in the county of Chemung and State of New York, have invented a new and Improved Machine for Gaging and Filing Saws; and I do hereby declare that the following is a full, clear, and exact description of the construction and operation of the same, reference being had to the annexed drawing, making part of this specification, and to the letters of reference marked thereon.

The same letters refer to like parts in each of the figures.

Figure 1 represents my machine as applied to filing a large circular saw, A.

B is the saw-frame to which an iron way or track C is attached.

D is a standard, the foot of which slides on the way, being fixed in the desired position by the set screw $a$. On the top of this the horizontal arm E, Fig. 2, is supported, being secured by the set screw F. This arm supports at one end the apparatus for filing and at the other that for gaging the teeth of the saw, and by loosening the setscrew is capable of being swung around to bring either one in connection with the saw, as indicated by the dotted lines $b\ b$.

The arrangement for filing consists of a clamp or vise G which firmly grasps the saw by means of the lever and cam H. To an upright portion of the arm I, Fig. 1, the arm J is attached by means of the thumb screw $c$ which supports the frame for the rollers K K, one of which is brought upon each side of the saw A, as shown in Fig. 2. On the top of the roller frame an adjustable gage M is attached, having a set screw $d$ through the lip or smaller portion. The rollers are adjusted by the screw $c$ to bring them in a position which is in a line with rake of the tooth; the saw is then revolved until the point of the tooth meets the point of the set screw $d$ in the gage. The gage is set so as to bring the line of the tooth just as far above the rollers as it is necessary that it should be filed away. The gage being movable or the screw which holds it is then turned one side, as shown in Fig. 2, and the filing is commenced, being done in the usual manner by hand. The rollers which are of wood or other suitable substance acting as guides to keep the file in its proper direction and to prevent the tooth being filed irregularly or in bad shape, since the metal can only be reduced to a line with their surfaces. To give the bevel required to the edge of the teeth the roller frame is movable on the arc of the arm J by means of the small spring lever $e$, by which it may be turned to the desired angle when it is secured by the lever falling into a notch in the arc. By this means a circular saw of any size may be accurately gaged and filed with uniform rake and bevel to all the teeth and with great ease and expedition. When not in use the set screw in the foot is loosened and the machine removed, the iron way only remaining.

For use on upright saws in the gate, the arm and foot are dispensed with and it consists only of the roller frame, arm J, upright I, and vise G as shown in Fig. 3. It is attached to the saw in an inverted position to bring the working side of the rollers in proximity to the cutting edge of the teeth. The gage M performs the same office as on the circular saw and the filing is effected in the same manner.

Fig. 2 represents the setting-gage, which consists of two jaws N, O, movable upon the arm E. O slides in a groove in N to regulate the width of set of the saw A, the two being firmly secured together by the set screw P. An adjusting screw Q is provided in a projection on the end of the arm E which is fixed in the side of the jaw O by the pin $f$, by means of which the jaws are drawn back and forth on the arm to adjust the opening to the saw. A set screw $h$ tightens them on the arm. A recess is made in the inner side of each jaw in which a piece of file, rubbing stone, hone, or other gritty or scouring substance $g$ is secured. These surfaces being adjusted to the exact width of set required, which is the space of the kerf which the saw is to cut, the teeth are set by any ordinary means until the points will touch the files or rubbing surfaces. As it is impossible to get the set of every tooth exactly correct and as the point is liable to be left with a bur in filing, the tendency of which would be to scratch and injure the lumber sawed, the rubbing surfaces $g\ g$ will by slowly revolving the saw between them reduce them to a perfect uniformity and a smooth finish adapting them to the best sawing.

Should the saw be inclined to run from being set too much on one side by adjusting one of the jaws closer to the plane of the saw on the irregular side that difficulty may be obviated; but saws filed and set by this apparatus will never be guilty of running from their true course, as the set, the rake, and bevel of the teeth may by its judicious use be made mathematically true.

The arm E is movable on its standard by a slot which takes the set screw F. This admits of its being adjusted to the edge or line of the saw while the way C on which it slides admits of adjusting it to the diameter or removing it from the saw. Either part of the machine may be instantly brought in use by merely loosening the set screw F sufficiently to revolve the arm.

I am aware that adjustable clamps and rollers for supporting and pressing upon the file while acting upon the teeth of the saw have been used and such I do not claim; but—

What I do claim as my invention and for which I desire to obtain Letters Patent is—

1. The adjustable gage M and guide-rollers K arranged and operating substantially as set forth, by means of which the cutting angle or rake of the teeth shall be accurately gaged before filing, the rollers acting as stops to prevent the further cutting of the file when the proper point is attained.

2. I also claim the adjustable setting-gage consisting of the movable jaws N and O combined with the files $g, g$ or other cutting surfaces which shall be equivalent in their operation for the purpose of gaging the width of set which the saw is to receive, and also for dressing and finishing the points of the teeth smoothly and uniformly after being set, substantially in manner set forth.

EMANUEL ANDREWS. [L. S.]

Witnesses:
N. W. BUCHANAN,
J. FRASER.